No. 666,380. Patented Jan. 22, 1901.
S. P. FOUST.
CORN HARVESTER.
(Application filed Apr. 25, 1899.)
(No Model.)
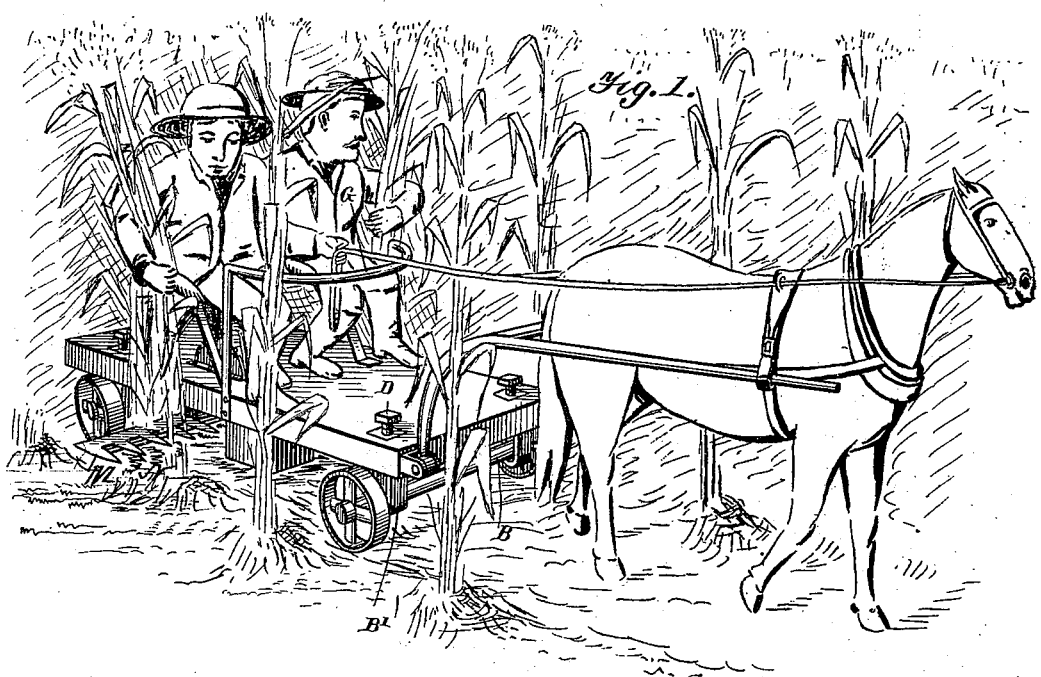
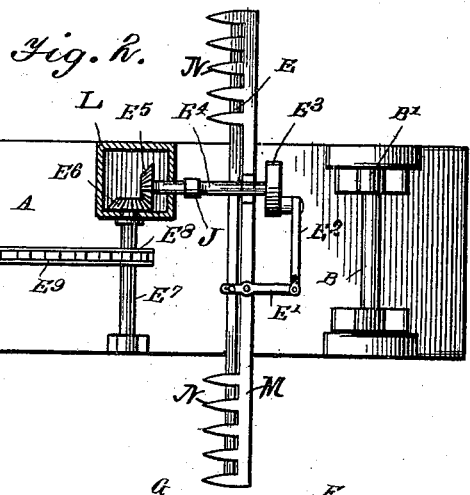
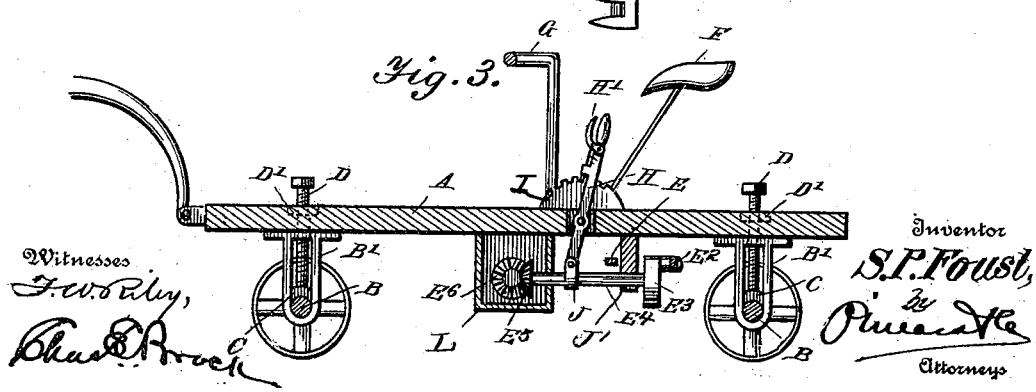
Witnesses
Inventor
S. P. Foust,
Attorneys
THE NORRIS PETERS CO., PHOTO-LITHO., WASHINGTON, D. C.

UNITED STATES PATENT OFFICE.

SOLOMON P. FOUST, OF NASHVILLE, MISSOURI.

CORN-HARVESTER.

SPECIFICATION forming part of Letters Patent No. 666,380, dated January 22, 1901.

Application filed April 25, 1899. Serial No. 714,405. (No model.)

*To all whom it may concern:*

Be it known that I, SOLOMON P. FOUST, a citizen of the United States, residing at Nashville, in the county of Barton and State of Missouri, have invented a new and useful Corn-Harvester, of which the following is a specification.

This invention is a new and useful construction of corn-harvester, one object being to provide a machine which can be drawn by one horse and which will cut two rows of corn at once.

Another object is to provide a machine on which two men can ride to gather the corn as it is cut.

Another object is to provide a suitable guard to prevent the corn falling upon the platform.

With these various objects in view my invention consists in the peculiar construction of the various parts and also in the novel combination or arrangement, all of which will be fully described hereinafter, and pointed out in the claim.

In the drawings forming part of this specification, Figure 1 is a view showing the practical application of my invention. Fig. 2 is a bottom plan view, and Fig. 3 is a transverse section showing the manner of adjusting the height of the frame.

In carrying out my invention I employ a platform or frame A, which is supported upon the front and rear axles B, said axles passing through the slotted bearings B' and also through the collars C, said collars having screw-bolts D swiveled thereto, said bolts passing through the nuts D'. By means of the screw-bolts and nut the axles can be raised or lowered by simply turning the bolts, and in this manner the cutting mechanism carried by the frame or platform can be raised or lowered. The cutting mechanism consists of a stationary bar M, arranged transversely of the machine in front of the hind wheels, and reciprocating cutter-bar E, operated by means of a lever E'. The bar M and the bar E each project a suitable distance beyond the sides of the platform, and each end of the bar M is provided with guards N, and the intermediate portion is provided with a bearing and with a pivot, and the bar E is provided with means adapted to engage with and sever the stalks while they are held against lateral movement by the guards N in the usual manner. The lever E' is mounted on the pivot on the bar M and is connected at one end with the bar E and is driven by a pitman $E^2$, connected to a crank-disk $E^3$, mounted upon a shaft $E^4$. The shaft $E^4$ is provided with a beveled gear $E^5$, which meshes with a similar gear $E^6$, mounted upon a shaft $E^7$. The shaft $E^7$ is journaled below the bottom of the platform and provided with a sprocket-wheel $E^8$, around which passes a chain $E^9$, operated by a sprocket $E^{10}$, mounted upon the front axle. The shaft $E^4$ is journaled in hanger J' and in a bearing in the side of the casing L and is adapted to slide longitudinally, as will be hereinafter referred to.

Should it be found desirable to throw the several parts out of operation, I provide a clutch mechanism consisting of the lever H, pivotally secured intermediate of its ends to the platform A and extending through the same so as to be within the reach of one of the operators seated upon the seat F. Upon this lever is pivotally secured near the handle thereof, a locking-pawl H', adapted to engage the teeth of the segmental rack I, and thus hold the shaft $E^4$ in or out of operative connection with the shaft $E^7$. J is a collar, of ordinary construction, on the shaft $E^4$ and pivotally connected to the lever H.

To more securely protect the two beveled gears from dust and rain and to prevent foreign substances from clogging their teeth, and thus prevent their running smoothly, I provide a housing L, which incases the same, but at the same time does not prevent the longitudinal movement of the shaft $E^4$ when operated by the clutch. By means of this mechanism the cutter-bar will be reciprocated as the machine is moved forward. Seats F are arranged at opposite ends of the platform to the rear of the cutting mechanism, and the guard-rail G is attached to the platform in front of the cutting mechanism and is curved forwardly, as shown in Fig. 1, the object being to direct the corn into the arms of the operators who are seated upon the seats. The wheels are located under the platform, so as not to engage with the stalks and run over them or throw them to one side beyond the reach of the operators on the machine. As fast as the stalks are collected in bunches of the required size they will be deposited on the ground for collection.

It will thus be seen that I provide an exceedingly cheap and simple construction of corn-harvester, in which the height of the platform can be adjusted as desired, and one in which the corn, after being cut, will be directed in the proper direction for collection by the operators riding upon the machine.

Having thus fully described my invention, what I claim as new, and desire to secure by Letters Patent of the United States, is—

In a corn-harvester, the combination, with a platform, of wheels and axles for supporting the same, one of the axles being provided with cutter-driving mechanism, a bar arranged transversely of the platform in front of the rear wheels, each end of which projects beyond the sides of the platform and is provided with guards, the intermediate portion of the bar being provided with a bearing and a pivot, a reciprocating cutter-bar mounted on the stationary bar, each end of which extends beyond the sides of the platform and is provided with knives, a lever mounted on the pivot on the stationary bar, one end of which is connected with the reciprocating bar, a shaft journaled in said bearing, one end of which is provided with means for connecting it with the driving mechanism and the opposite end is provided with a crank and the intermediate portion with a shifting collar, a pitman between the crank and the end of the lever, a lever in engagement with the collar and projecting up through the platform, two seats on the platform, one at each side thereof, and a curved guard-rail above the platform in front of said seats, substantially as described.

SOLOMON P. FOUST.

Witnesses:
A. WALTER,
W. H. THOMAS.